US012627511B2

(12) United States Patent
Goodman et al.

(10) Patent No.: US 12,627,511 B2
(45) Date of Patent: May 12, 2026

(54) DEVICE ONBOARDING IN DISTRIBUTED SYSTEMS

(71) Applicant: Dell Products L.P., Round Rock, TX (US)

(72) Inventors: Bradley K. Goodman, Nashua, NH (US); Joseph Caisse, Burlington, MA (US); Govind Pulikode Mukundan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/616,551

(22) Filed: Mar. 26, 2024

(65) Prior Publication Data

US 2024/0333531 A1     Oct. 3, 2024

Related U.S. Application Data

(60) Provisional application No. 63/455,215, filed on Mar. 28, 2023.

(51) Int. Cl.
*H04L 9/32* (2006.01)
*H04L 9/30* (2006.01)

(52) U.S. Cl.
CPC .......... *H04L 9/3268* (2013.01); *H04L 9/3073* (2013.01); *H04L 9/3265* (2013.01)

(58) Field of Classification Search
CPC .... H04L 9/3268; H04L 9/3073; H04L 9/3265
See application file for complete search history.

(56) References Cited

U.S. PATENT DOCUMENTS

| | | | | |
|---|---|---|---|---|
| 2014/0019746 A1* | 1/2014 | Hans | ....................... | H04W 4/80 |
| | | | | 713/150 |
| 2020/0279015 A1* | 9/2020 | Lu | ......................... | G06Q 10/067 |
| 2021/0409217 A1* | 12/2021 | Maley | ................... | H04L 63/123 |
| 2023/0087052 A1* | 3/2023 | Korja | ................. | H04L 63/0263 |
| | | | | 709/245 |
| 2023/0137814 A1* | 5/2023 | Staufer | ................ | H04W 12/06 |
| | | | | 455/411 |
| 2023/0156457 A1* | 5/2023 | Liu | ....................... | H04W 60/04 |
| | | | | 455/418 |
| 2023/0164671 A1* | 5/2023 | Vig | ....................... | H04W 48/10 |
| | | | | 370/338 |

(Continued)

OTHER PUBLICATIONS

Cooper, et al. "FIDO Device Onboard Specification 1.1" Fido Alliance. [https://fidoalliance.org/specs/FDO/FIDO-Device-Onboard-RD-v1.1-20211214/], Dec. 14, 2021, 114 pages. (Year: 2021).*

*Primary Examiner* — Rupal Dharia
*Assistant Examiner* — Devin E Almeida
(74) *Attorney, Agent, or Firm* — WOMBLE BOND DICKINSON (US) LLP

(57) ABSTRACT

Methods and systems for managing endpoint devices are disclosed. The endpoint devices may be managed by onboarding them. To onboarding the endpoint devices, ownership vouchers and proxy certificates may be used to cryptographically verify to which entities authority over the endpoint devices have been delegated. The proxy certificates may extend certificate and/or delegation chains in ownership vouchers to other devices. The extended chains may eliminate the need for proliferation of keys used to demonstrate authority over endpoint devices.

20 Claims, 11 Drawing Sheets

(56)        References Cited

U.S. PATENT DOCUMENTS

| | | | |
|---|---|---|---|
| 2024/0031134 A1* | 1/2024 | Alexander | H04L 9/0822 |
| 2024/0086205 A1* | 3/2024 | Haddad | G06F 21/575 |
| 2024/0126845 A1* | 4/2024 | Goodman | G06F 21/31 |
| 2024/0129134 A1* | 4/2024 | Goodman | H04L 9/3265 |
| 2024/0129736 A1* | 4/2024 | Chao | H04L 9/3268 |
| 2024/0235852 A1* | 7/2024 | Cate | H04L 9/3268 |
| 2024/0241927 A1* | 7/2024 | Richman | G06F 21/6218 |
| 2024/0264878 A1* | 8/2024 | Hutcheson | G06F 9/5077 |
| 2024/0333706 A1* | 10/2024 | Mohammed | H04L 63/102 |

* cited by examiner

DEVICE ONBOARDING IN DISTRIBUTED SYSTEMS

CROSS REFERENCE TO RELATED APPLICATIONS

This application claims the benefit of U.S. Provision Patent Application 63/455,215, filed on Mar. 28, 2023, and titled "Group-Based Secure Onboarding Orchestration By-Proxy", and is incorporated by reference in its entirety here.

FIELD

Embodiments disclosed herein relate generally to device management. More particularly, embodiments disclosed herein relate to systems and methods to manage onboarding of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
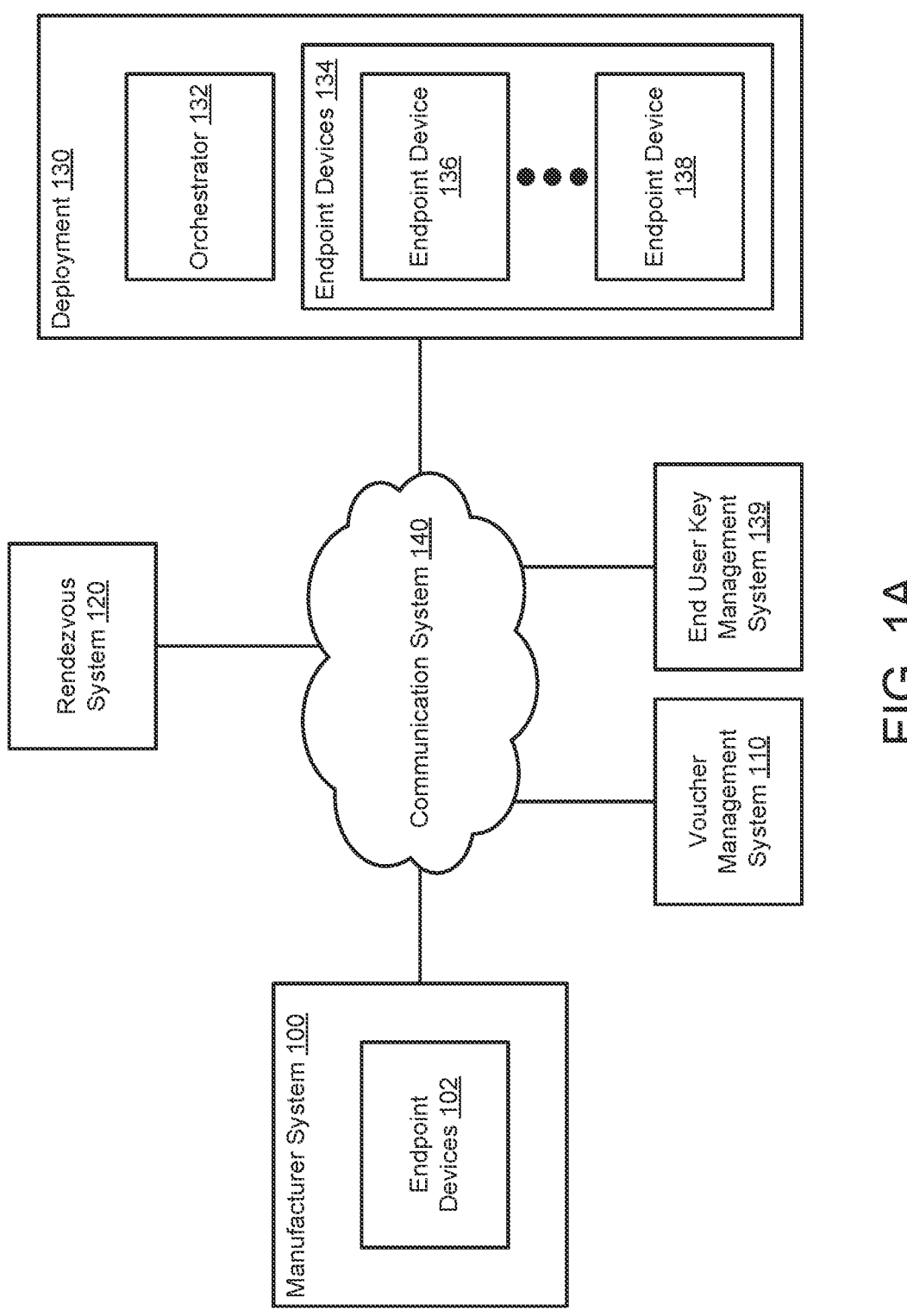
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing authority in a distributed system. To manage authority, endpoint devices may be onboarded.

During onboarding, authority over the endpoint devices may be established. To establish the authority, ownership vouchers, proxy certificates, and/or other data structures may be presented to the endpoint devices. The endpoint devices may utilize these data structures to identify the entities that have authority over the endpoint devices.

The ownership vouchers may delegate authority over the endpoint devices by including public keys. The public keys may be used to demonstrate that an entity alleged to have authority of the endpoint device has access to corresponding private keys.

In some cases, entities such as orchestrators tasked with onboarding may not have access to such corresponding private keys. For example, to reduce key proliferation, the private keys to which authority is delegated in the ownership vouchers may not be distributed to orchestrators or other entities tasked with performing onboarding processes for endpoint devices.

To enable orchestrators to demonstrate that they have authority over the endpoint devices, the proxy certificates may extend the chains of certificates/delegations included in the ownership voucher. The extended chains may designate keys controlled by the orchestrators as have authority over the endpoint devices. Thus, the endpoint devices may validate that the orchestrators have been delegated authority over the endpoint device from other entities to which authority is explicitly delegated in the ownership vouchers.

By doing so, embodiments disclosed herein may facilitate establishment of authority while limiting key proliferation. Accordingly, a system in accordance with embodiments disclosed herein may be less like to suffer and suffer at reduced levels from compromises of devices that may expose keys used to establish authority for onboarding and/or other purposes. For example, keys to which authority is delegated in ownership vouchers may be generally restricted from distribution while still allowing authority over those devices to be established.

Accordingly, embodiments disclosed herein may address, among others, the technical problem of establishing authority in a distributed system. The disclosed embodiments may do so by using proxy certificates to extend delegation from keys that are restricted from being proliferated to other more usable keys.

In an embodiment, a method for managing endpoint devices is provided. The method may include, during an onboarding of an endpoint device of the endpoint devices: obtaining, by the endpoint device, an ownership voucher and a proxy certificate from an orchestrator controlled by an owner of the endpoint device; attempting to validate that: the proxy certificate is signed using a key associated with the owner, and the orchestrator is in possession of a key referenced by the proxy certificate; in an instance of the attempting where the proxy certificate is validated as being signed with the key associated with the owner and the orchestrators is validated as being in possession of the key referenced by the proxy certificate: concluding, by the endpoint device, that authority over the endpoint device has been delegated from the owner to the orchestrator; and based on the authority, completing the onboarding in cooperation with the orchestrator.

Attempting to validate that the proxy certificate is signed using the key associated with the owner may include attempting to identify a certificate chain stored in the ownership voucher that allegedly delegates authority over the endpoint device to the owner; in an instance of the attempting to identify the certificate chain where at least one certificate chain of the ownership voucher is found to allegedly delegate the authority: attempting to cryptographically validate the at least one certificate chain; in an instance of the attempting to cryptographically validate the at least one certificate chain where the at least one certificate chain is cryptographically validated successfully: identifying a delegation statement in the at least on certificate chain indicating that authority has been delegated to an entity associated with a public private key pair; and attempting to use a public key of the public private key pair to validate that the proxy certificate is signed using the key.

The key may be a private key of the public private key pair, and the private key may be controlled by the owner.

The private key may be inaccessible to the orchestrator.

Completing the onboarding may include obtaining, by the endpoint device and from the orchestrator, a signed instruction; attempting, by the endpoint device, to validate the instruction using a public key to which the proxy certificate delegates authority over the endpoint device; and in an instance of the attempting to validate where the signed instruction is validated: following, by the endpoint device, the signed instruction.

Attempting to validate the instructions may include using a signature verification algorithm to attempt to establish trusted in the signed instruction using the public key to which the proxy certificate delegates authority over the endpoint device.

The signed instruction may indicate performance of at least one action selected from a list of actions consisting of: replacing an existing root of trust maintained by the endpoint device; and modifying a configuration of the endpoint device. The configuration may be a software, firmware, hardware, or other type of configuration. The modification may better align operation of the endpoint device with goals for operation of the endpoint device as set by an owner.

The public key to which the proxy certificate delegates authority over the endpoint device may be part of a second public private key pair, and the orchestrator may control a private key of the second public private key pair and uses the private key to sign instructions issued to at least some of the endpoint devices.

The ownership voucher and proxy certificate may be a unitary data structure, and the unitary data structure may include delegation statements that delegate authority over the endpoint device to entities.

The ownership voucher of the unitary data structure may include a portion of the delegation statements that delegate authority from a root of trust of the endpoint device to a portion of the entities, and the proxy certificate of the unitary data structure may include a second portion of the delegation statements that delegate authority over the endpoint device a second portion of the entities, and the second portion of the entities may include the orchestrator.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, any number of endpoint devices may be deployed to a deployment. The endpoint devices may cooperatively provide the computer implemented services.

To manage the endpoint devices to provide the computer implemented services, authority over the endpoint devices may need to be established. In other words, the endpoint devices must be able to ascertain that they are under the authority of a particular entity. Based on this authority, the entity may, for example, issue work order and/or other types of instructions to manage the operation of the endpoint devices to provide desired computer implemented services.

To facilitate ascertaining of the authority over them, the endpoint devices may utilize secrets. The secrets may allow the endpoint devices to cryptographically verify delegations of authority over the endpoint devices from a root of trust (e.g., a trusted key of a manufacturer) to another entity (e.g., an owner).

Overtime the resources requirements for providing computer implemented services may change and/or endpoint devices may need to be replaced. For example, additional services may be desired to be provided, different types of services may be desired to be provided, etc. In another example, an endpoint device that contributed to the computer implemented services may cease to operate thereby reducing the quantity of resources available to provide the computer implemented services. To satisfy the resource requirements based on these changes to an exist systems, additional endpoint devices may be onboarded and thereby contribute to the resources available to provide the computer implemented services.

However, onboarding an endpoint device may require access to particular types of cryptographic information. If this cryptographic is not available, then the endpoint devices my not be able to be onboarded.

Further, to facilitate management of large numbers of endpoint devices, multiple management entities such as orchestrators may be utilized. To successfully onboard endpoint devices, the orchestrator that onboards each endpoint device may need to have access to the particular cryptographic information (e.g., the endpoint devices may only recognize the authority of entities that can demonstrate access to the cryptographic information). As system complexity increases, this requirement may be progressively more difficult to meet, and wide scale distribution of cryptographic information may reduce the security of the cryptographic information. If the cryptographic information is compromised by a malicious entity, the malicious entity may utilize the cryptographic information to take authority of the endpoint devices.

In general, embodiments disclosed herein may provide methods, systems, and/or devices for managing endpoint devices to improve their likelihood of being able to cryptographically verify authority over them thereby allowing them to contribute to desired computer implemented services. To improve the likelihood, embodiments disclosed herein may provide a framework for onboarding endpoint devices in a manner that allow for the endpoint devices to verify authority over them without the proliferation of cryptographic information.

The framework may include processes for establishing cryptographic chains of delegation of authority that do not require orchestrators or other management entities to have access to the particular cryptographic information that the endpoint devices rely on for establishing trust. By not requiring that the orchestrators have access to this cryptographic information, the endpoint devices may be onboarded with reduced risk of the cryptographic information being compromised.

To provide the above noted functionality, the system of FIG. 1A may include manufacturer system 100, voucher management system 110, rendezvous system 120, deployment 130, and communication system 140. Each of these components is discussed below.

Manufacturer system 100 may be a system used by a manufacturer of endpoint devices 102. Manufacturer system 100 may include, for example, factories, assembly plants, distribution facilities, and/or other types of facilities for creating endpoint devices 102. Endpoint devices 102 may be data processing systems which may be usable to provide various computer implemented services.

When manufactured, manufacturer system 100 may put endpoint devices 102 in condition for subsequent onboarding to various deployments (e.g., 130) and/or other environments (e.g., data centers, edge systems, etc.) in which endpoint devices may be positioned to provide desired computer implemented services.

Figure 1B:
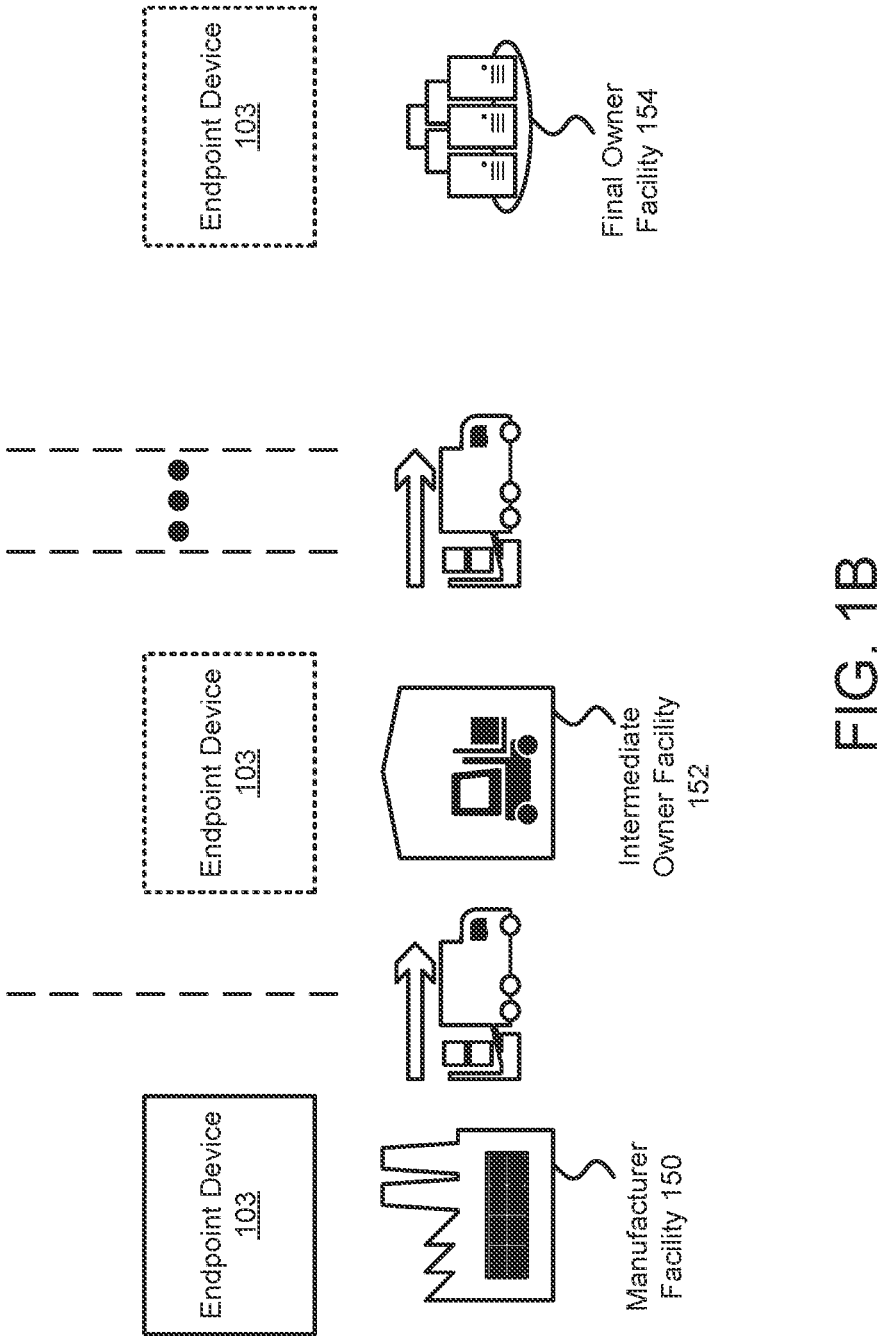
FIGS. 1B-1K show diagrams illustrating aspects of operation of the system of FIG. 1A in accordance with an embodiment.
Figure 1C:
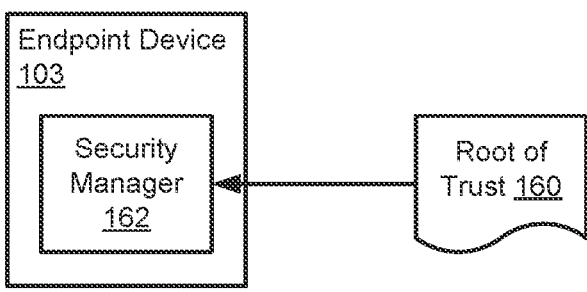

To place endpoint devices 102 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), and (iii) install various pieces of software, establish various configuration settings, update various hardware components, and/or perform other actions so that only entities to which authority over the endpoint devices has been delegated from the root of trust are able to control and/or otherwise use the endpoint device. Refer to FIG. 1C for additional details regarding establishing a root of trust for the endpoint device.

Once constructed, endpoint devices 102 may be sold directly to end users and/or placed into the stream of commerce (e.g., sold to resellers, etc.) and through which endpoint devices 102 eventually reach end users. Refer to FIG. 1B for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 110 may document and manage information regarding changes in ownership and authority over endpoint devices 102. To do so, voucher management system 110 may generate ownership vouchers. An ownership voucher may be a cryptographically verifiable data structure usable to establish which entities have authority over endpoint devices 102.

For example, an ownership voucher may include certificate chains that documents the changes in ownership and authority over endpoint devices 102. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to FIGS. 1D-1I for additional information regarding ownership vouchers.

When one of endpoint devices 102 is obtained by an end user, the end user may add the endpoint devices to a collection such as deployment 130. When so added, an orchestrator (e.g., 132) or other entity may utilize a corresponding ownership voucher from voucher management system 110 to establish authority over the endpoint device. In this manner, any number of endpoint devices (e.g., 134) may be onboarded and brought under the control of a control plane which may include any number of orchestrators (e.g., 132). Different endpoint devices (e.g., 136, 138) may be onboarded at different points in time and/or for different purposes.

However, the ownership voucher provided by voucher management system 110 may delegate authority over the endpoint device to the end user by establishing a public key of a public private key pair maintained by the end user as having been delegated authority over the endpoint device. To issue verifiable work orders or other types of instructions to the endpoint device, the work order may need to be signed by the private key of the public private key pair. However, for security and/or other purposes, the end user may retain the private key in end user key management system 139, which may be separate from orchestrator 132. Thus, orchestrator 132 may not have access to the private key.

To enable orchestrator 132 to establish authority over an endpoint device without having access to the private key, orchestrator 132 may utilize a proxy certificate. The proxy certificate may be a cryptographically verifiable certificate that further delegates authority from the end user to another entity such as orchestrator 132. Refer to FIGS. 1J-1K for additional information regarding proxy certificates.

In other words, the proxy certificate may establish an additional delegation (beyond the delegations in the ownership voucher) by adding an addition certificate (or multiple) to the certificate chain included in an ownership voucher. The combination of the ownership voucher and proxy certificate may allow the endpoint device to establish a verifiable chain of delegations of authority from the root of trust to an entity designated by the owner of the endpoint device.

When one of endpoint devices 102 initially powers on after manufacturing, the endpoint device may reach out to rendezvous system 120. Rendezvous system 120 may be a system that directs endpoint devices to entities such as orchestrator 132 that will onboard the endpoint devices.

To do so, the entities such as orchestrator 132 may provide rendezvous system 120 with information usable to authenticate that orchestrator 132 will manage the endpoint devices. For example, orchestrator 132 may provide information from ownership vouchers, proxy certificates, and/or other sources to rendezvous system 120. Once verified, rendezvous system 120 may redirect endpoint devices to the corresponding entities when the endpoint devices reach out to rendezvous system 120 after being powered on.

Once onboarded, endpoint devices 134 may perform various operations to complete onboarding. The operations may include any number and type of operation (e.g., configuration operations, security operations, software installation operations, account establishment operations, etc.), and the operations may be directed by orchestrator 132. Once onboarded, the endpoint devices may begin to contribute to computer implemented services by deployment 130.

When providing their functionality, any of manufacturer system 100, endpoint devices 102, voucher management system 110, rendezvous system 120, deployment 130, orchestrator 132, endpoint devices 134, and/or end user key management system 139 may perform all, or a portion, of the processes, interactions, and methods illustrated in FIGS. 1B-3.

Any of manufacturer system 100, endpoint devices 102, voucher management system 110, rendezvous system 120, deployment 130, orchestrator 132, endpoint devices 134, and end user key management system 139 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 140. Communication system 140 may facilitate communications between the components of FIG. 1A. In an embodiment, communication system 140 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, endpoint devices (e.g., 102) may traverse through a stream of commerce between when the endpoint devices are manufactured and when the endpoint devices reaches a final owner. Turning to FIG. 1B, diagram of an example path through a stream of commerce in accordance with an embodiment is shown.

In FIG. 1B, vertical dashed lines indicate different geographic locations in which various facilities may be positioned. Representations of such facilities (e.g., 150-154) may be positioned below the pages. Representations of movement of endpoint devices between these facilities is illustrated using truck shaped images. Some instances of the graphical representation of endpoint device 103 are illustrated using dashed outlining to indicate that endpoint device 103 may only be present at one of the facilities at any point in time, and the instance of the graphical representation of endpoint device 103 drawn in solid outlining indicates where endpoint device 103 is located in the example shown in FIG. 1B.

The stream of commerce may begin, for example, at manufacturer facility 150. Manufacturer facility 150 may be a facility operated by a manufacturer of endpoint devices. During manufacturing, the manufacturer may establish a root of trust for an endpoint device (e.g., 103). Refer to FIG. 1C for additional details regarding establishing the root of trust for endpoint device 103. The root of trust may be used by endpoint device 103 to discern which entities have authority over it, which entities to trust, and/or for other purposes. The initial root of trust may indicate that the manufacturer is the owner of and has authority over endpoint device 103.

Once the root of trust is established, endpoint device 103 may be sold and resold to various intermediate owners. These intermediate owners may operate various intermediate owner facilities (e.g., 152), such as warehouses, distribution centers, sales rooms, etc. When sold, endpoint device 103 may be shipped to these various facilities.

Finally, once purchased from an intermediate owner, a final owner may operate a final owner facility (e.g., 154), such as a data center, edge deployment, and/or other type of computer deployment to which endpoint device 103 may be onboarded. To facilitate onboarding, voucher management system 110 may collect and add information regarding changes in ownership of endpoint device 103 to an ownership voucher. Orchestrator 132 may use the ownership voucher and/or a proxy certificate to establish authority over endpoint device 103. Refer to FIGS. 1J-1K for additional details regarding establishing authority over endpoint devices during onboarding.

Turning to FIG. 1C, a diagram of an example process for establishing a root of trust in endpoint device 103 in accordance with an embodiment is shown. To establish a root of trust, when endpoint device 103 is manufactured, root of trust 160 may be installed in endpoint device 103.

Root of trust 160 may be a public key of a public private key pair controlled by the manufacturer of endpoint device 103. The public private key pair may be established using any process.

To install root of trust 160, root of trust 160 may be stored in endpoint device 103. The storage location and security precautions taken with respect to storing root of trust 160 may vary depending on the architecture of endpoint device 103.

For example, endpoint device 103 may host or include a security manager (e.g., 162). Security manager 162 may be implemented using a discrete hardware component, or may be a software component. Security manager 162 may enforce various security policies on endpoint device 103. For example, the security policies may require that endpoint device 103 validate authority over it back to root of trust 160 before complying with any instructions from other entities that allege to have authority over endpoint device 103.

To validate entities having authority over endpoint device 103, endpoint device 103 may utilize ownership vouchers and/or proxy certificates.

Figure 1D:
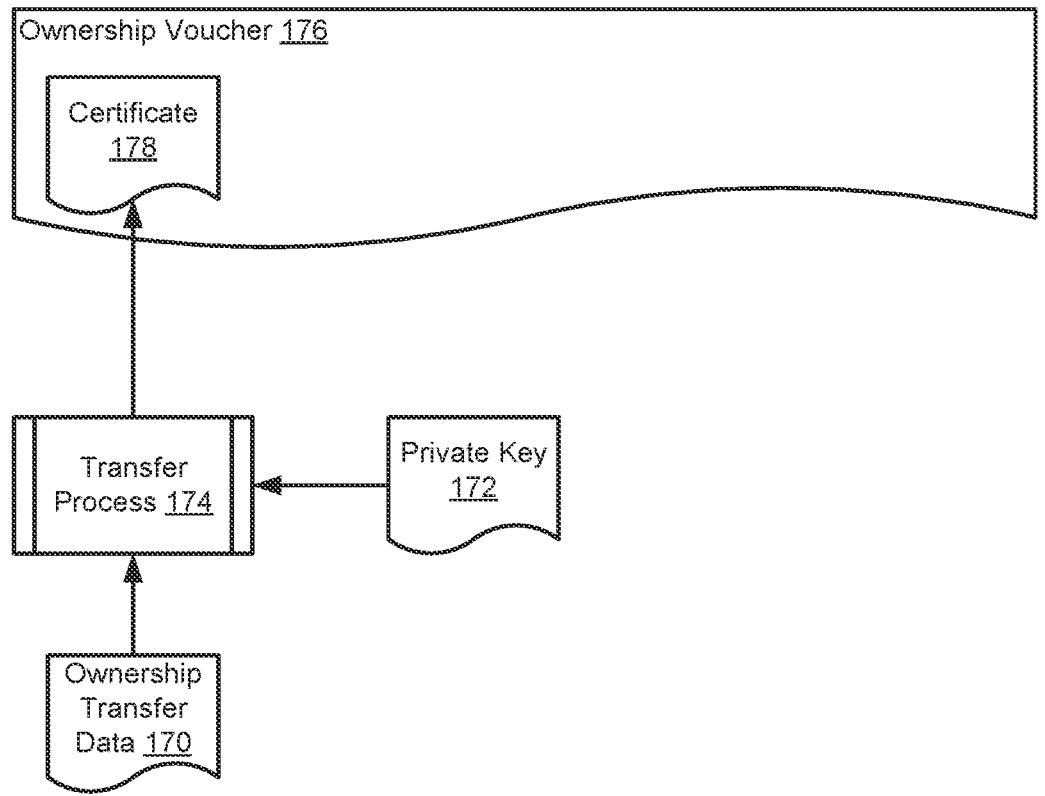
Figure 1E:
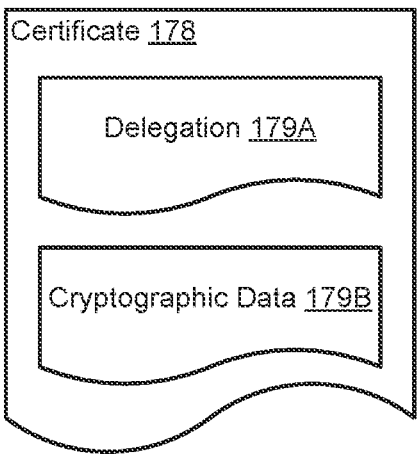

Turning to FIG. 1D, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to FIG. 1E for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Figure 1F:
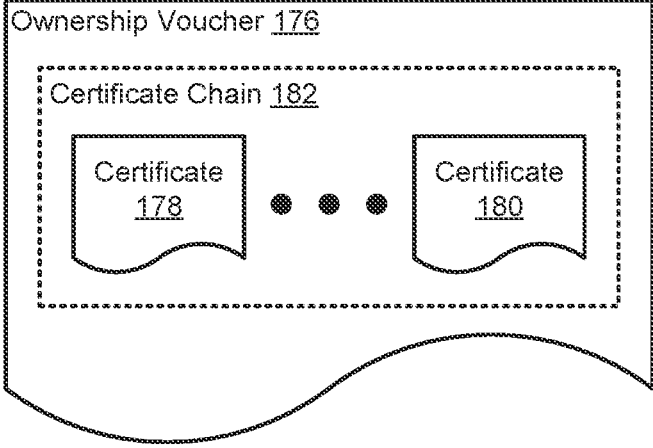
Figure 1G:
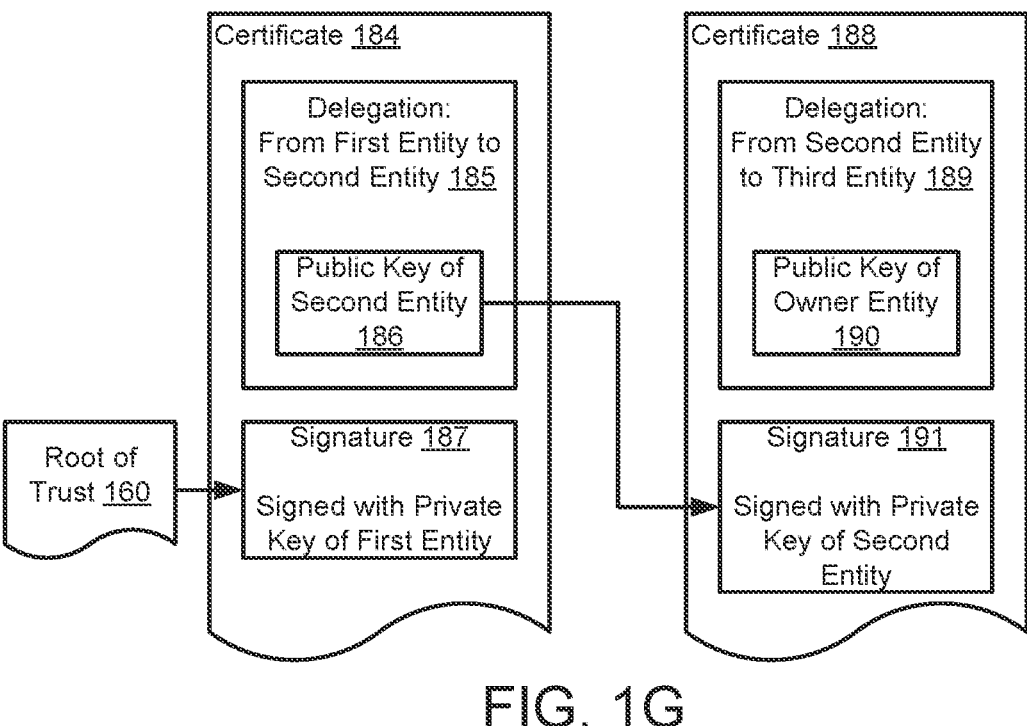
Figure 1H:
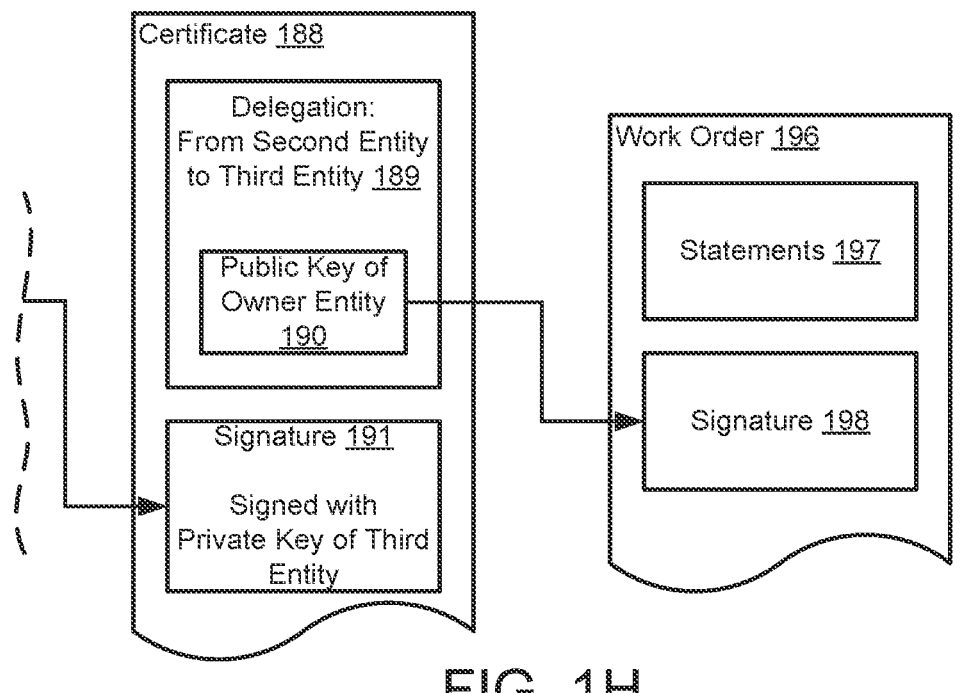

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to FIGS. 1F-1H for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Turning to FIG. 1E, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Turning to FIG. 1F, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178-180) that can be sequentially verified back to the root of trust. Refer to FIGS. 1G-1H for additional information regarding establishing valid certificate chains.

Turning to FIG. 1G, a diagram of an example process for validating a portion of a certificate chain of an ownership voucher in accordance with an embodiment is shown. In FIG. 1G, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 91 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Turning to FIG. 1H, a diagram of an example process for validating a work order in accordance with an embodiment is shown. In FIG. 1H, only a portion of the certificates (e.g., 184, 188) shown in FIG. 1G are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. These statements may include instructions that change the manner of operation of the endpoint device to, for example, comply with security requirements of a new owner, and/or perform other actions.

However, in some cases, orchestrators or other entities may lack access to the private key to which public key of owner entity 190 and/or other public keys in the certificate chains delegate authority over the endpoint device. Thus, the orchestrators may lack the ability to generate work orders that may be validated by the endpoint devices using information from ownership vouchers.

Figure 1I:
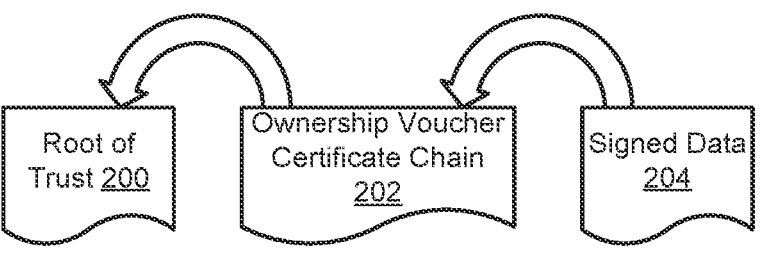
Figure 1J:
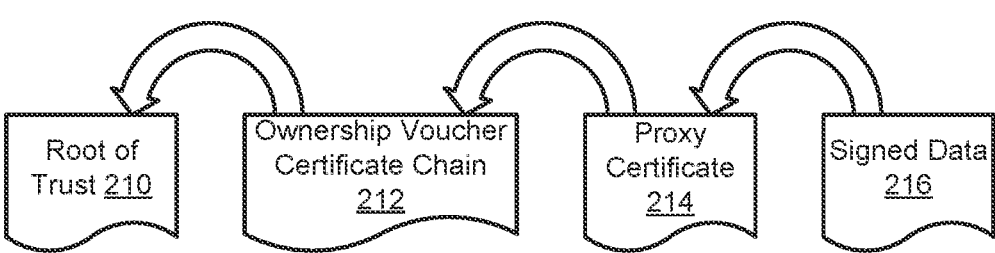
Figure 1K:
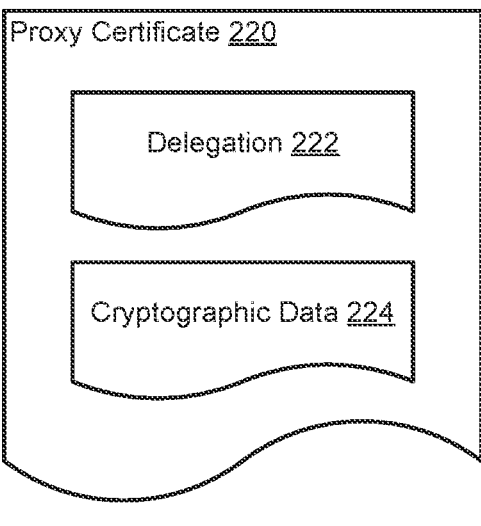

For example, turning to FIG. 1I which shows a diagram in accordance with an embodiment, signed data 204 such as a work order may be validated if public keys included in ownership voucher certificate chains (e.g., 202) correspond to private keys to which the work order issuing entity has access. In this example, ownership voucher certificate chain 202 may be used to establish delegations of authority from root of trust 200 for an endpoint device to the keys used to sign signed data 204.

However, if other signed data (e.g., 216) is signed using keys that cannot be validated as having authority delegated using ownership voucher certificate chain 202, then the endpoint device may treat the other signed data as not being trustworthy.

To enable other signed data to be validated, embodiments disclosed herein may utilize proxy certificates (e.g., 214).

Turning to FIG. 1J, a diagram illustrating a process of utilizing proxy certificate 214 to validate signed data (e.g., 216) in accordance with an embodiment is shown.

To enable signed data 216 that is signed using keys that cannot be validated using ownership voucher certificate chains (e.g., 212), a proxy certificate 214 may be utilized. Proxy certificate 214 may be used to extend the chains of certificates and delegation statements from those included in ownership voucher certificate chain. Refer to FIG. 1K for additional information regarding proxy certificates.

By extending the certificate and delegation chains, signed data 216 may be validated as having been signed using a key to which authority has been delegated all the way back to root of trust 210. For example, proxy certificate 214 may further delegate authority from an owner to another key controlled by orchestrators used by the owner. In this manner, the endpoint device may extend the chain of delegations to keys that may be controlled by orchestrators used by the owner. Accordingly, the orchestrators may not need to have access to the keys controlled by the owner and to which ownership has been delegated in ownership vouchers.

Turning to FIG. 1K, a diagram of an example proxy certificate 220 in accordance with an embodiment is shown. As noted above, the proxy certificate may enable trust to be established in an entity that does not have access to an owner key as indicated by an ownership voucher.

For example, proxy certificate 220 may include delegation 222 and cryptographic data 224. Delegation 222 may be a delegation statement that delegates authority over an endpoint device from an owner to an orchestrator or other device. The delegation may be made, for example, by including a public key of a public private key pair controlled by the device to which authority over the endpoint device is being delegated.

Cryptographic data 224 may include a signature generated using a private key controlled by the owner of the endpoint device. The corresponding public key may be included in a delegation statement in an ownership voucher. Thus, the public key in the ownership voucher may be used to verify the integrity and authenticity of proxy certificate 220. In other words, extending a certificate/delegation chain included in the ownership voucher.

Proxy certificate 220 may be generated by, for example, (i) having the orchestrator or other device to which authority is being delegated generate or otherwise obtain a public private key pair, (ii) initiate a certificate signing request for the public key (and/or corresponding delegation statements) of the public private key pair to the entity designated in the ownership voucher as having authority over an endpoint device, and (iii) presuming that the certificate signing request is honored by the designated entity, obtain the proxy certificate from the entity. The proxy certificate may be signed using the private key controlled by the entity.

While described with respect to a certificate signing request, it will be appreciated that other certificate generation architectures may be used. For example, a x509 certificate, a certificate authority, or other architecture for generating certificates usable to extend delegations in ownership vouchers may be used to obtain proxy certificate 220.

Once proxy certificate 220 and an ownership voucher for an endpoint is obtained, an orchestrator or other device that controls the key to which the proxy certificate delegates authority over the endpoint device may establish authority and control of an endpoint device. Consequently, the orchestrator or other device may be able to complete an onboarding of the endpoint device by, for example, providing copies of the ownership voucher and proxy certificate to the endpoint device and issuing signed workorder or other demonstrating that the orchestrator has possession of the key designed as having authority over the endpoint device in the proxy certificate.

Figure 2A:
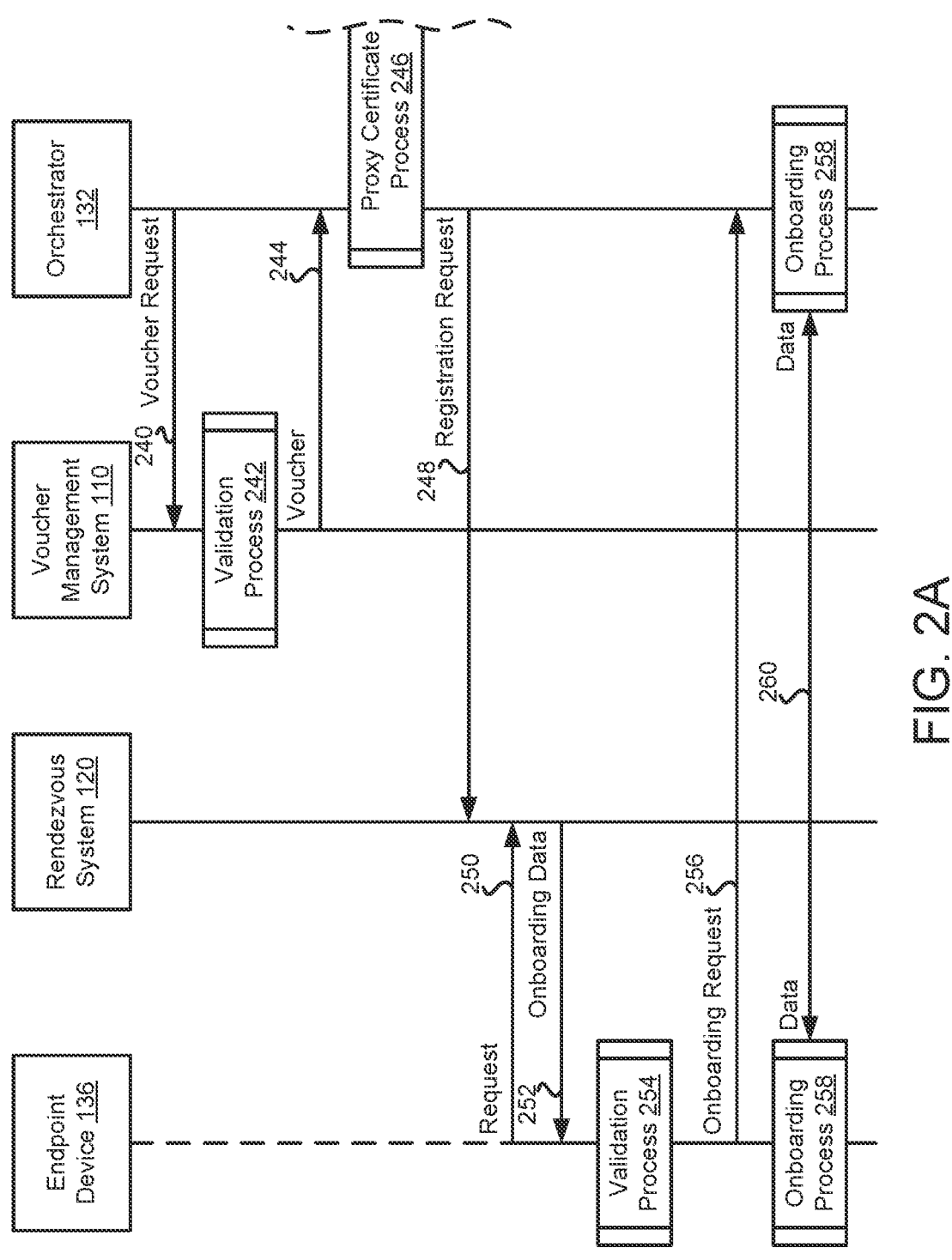
FIGS. 2A-2B show interaction diagrams in accordance with an embodiment.
Figure 2B:
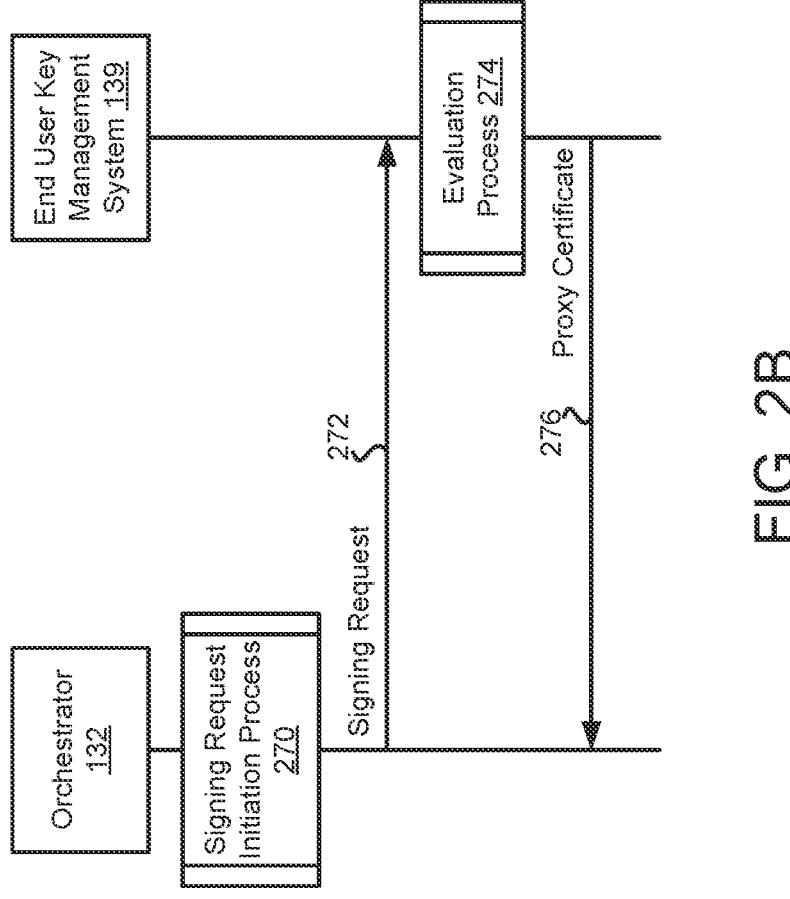

To further clarify embodiments disclosed herein, interactions diagrams in accordance with an embodiment are shown in FIGS. 2A-2B. These interactions diagrams may illustrate how data may be obtained and used within the system of FIGS. 1A-1K.

In the interaction diagrams, processes performed by and interactions between components of a system in accordance with an embodiment are shown. In the diagrams, components of the system are illustrated using a first set of shapes (e.g., 110, 120, 132, 136, etc.), located towards the top of each figure. Lines descend from these shapes. Some descending lines are drawn in dashing to indicate that the device is not operating during corresponding periods of time, while other lines are drawn solid to indicate that the devices are operating during the corresponding period of time. For example, in FIG. 2A, endpoint device 136 may not be operating until interaction 250.

Processes performed by the components of the system are illustrated using a second set of shapes (e.g., 242, 246, etc.) superimposed over these lines. Interactions (e.g., communication, data transmissions, etc.) between the components of the system are illustrated using a third set of shapes (e.g., 240, 244, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 240 may occur prior to the interaction labeled as 244. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during onboarding of an endpoint device.

To onboard endpoint device 136, orchestrator 132 may, at interaction 240, send a voucher request to voucher management system 110. The voucher request may be a request for an ownership voucher for an endpoint device (e.g., 136). In the example interactions shown in FIG. 2A, an entity may have purchased endpoint device 136 thereby causing voucher management system 110 to add information to the ownership voucher for endpoint device 136 that establishes chains of certificates/delegations from the root of trust to the owner.

When received, voucher management system 110 may attempt to validate the voucher request by performing validation process 242. During validation process, credentials and/or other information from orchestrator 132 may be evaluated to ascertain whether an ownership voucher should be provided. Presuming that the validation process is successful, at interaction 244, voucher management system 110 may send an ownership voucher to orchestrator 132.

If orchestrator 132 does not have access to the private key to which the ownership voucher delegates authority over endpoint device 136, orchestrator 132 may perform proxy certificate process 246. During proxy certificate process 246, orchestrator 132 may cooperatively generate a proxy certificate with other devices. Refer to FIG. 2B for additional details regarding proxy certificate process 246.

The resulting proxy certificate may delegate authority over endpoint device 136 from the key to which authority is delegated in the ownership voucher to a key controlled by orchestrator 132.

Once obtained, at interaction 248, orchestrator 132 may send a registration request to rendezvous system 120. The registration request may be a request to have rendezvous system 120 redirect endpoint device 136 to orchestrator 132. The registration request may include information usable by rendezvous system 120 to verify that orchestrator 132 should have authority over endpoint device 136.

Once endpoint device 136 reaches a destination location (e.g., a data center, edge deployment, etc.), endpoint device 136 may be powered on and may, at interaction 250, send a request to rendezvous system 120 regarding which entity to contact as part of an onboarding procedure.

Presuming the rendezvous system 120 registered orchestrator 132 based on the registration request, rendezvous system may, at interaction 252, provide onboarding data to endpoint device 136. The onboarding data may include, for example, various validation information and re-direct information (e.g., network address) for orchestrator 132.

Once obtained, endpoint device 136 may perform validation process 254. During validation process 254, endpoint device 136 may attempt to validate the onboarding data. If successfully validated, endpoint device 136 may, at interaction 256, generate and send an onboarding request to orchestrator 132. The onboarding request may request, for example, cryptographic data such as ownership vouchers and proxy certificates. The request may initiate a cooperatively performed onboarding process 258 by endpoint device 136 and orchestrator 132.

During onboarding process 258, orchestrator 132 may provide endpoint device 136 with the ownership voucher, a proxy certificate, and/or other information to enable endpoint device 136 to ascertain whether orchestrator 132 has authority over endpoint device 136. To do so, endpoint device 136 may, as discussed above, attempt to validate certificate chains and delegation statements to establish a chain of delegation of authority from the root of trust to orchestrator 132 (e.g., the delegation statements may identify a particular public key for which orchestrator 132 controls a corresponding private key). Endpoint device 136 may issue various challenges (e.g., signing challenges) to orchestrator 132, and endpoint device 136 may test the signed responses to the challenges using the particular public key. If the signed responses can be validated using the public key, then endpoint device 136 may conclude that orchestrator 132 has authority over it.

If successfully validated as having authority over it, endpoint device 136 may continue to participate in the onboarding by, for example, evaluating the trustworthiness of signed work orders issued by orchestrator 132, and complying with any signed work orders that can be validated as having been signed with the private key corresponding to the particular public key.

The aforementioned work orders may cause endpoint device 136 to, for example, modify its configuration, install/ remove software, enable/disable various hardware components, establish accounts for end users, and/or perform other operations as directed by orchestrator 132. The aforementioned operations may place endpoint device 136 in an operating state specified by the owner of endpoint device 136.

Turning to FIG. 2B, a second interaction diagram in accordance with an embodiment is shown. The second interaction diagram may illustrate processes and interactions that may occur during creation of a proxy certificate.

To create a proxy certificate, orchestrator 132 may perform signing request initiation process 270. During signing request initiation process, orchestrator 132 may obtain a public private key pair.

Once obtained, orchestrator 132 may, at interaction 272, generate and send a signing request to end user key management system 139. The signing request may initiate a process for end user key management system 139 to sign a delegation statement (e.g., which may include the public key of the public-private key pair) using the key to which the ownership voucher for an endpoint device delegates authority over it.

Once obtained, end user key management system 139 may perform evaluation process 274. During evaluation process 274, end user key management system 139 may evaluate the request (e.g., may user a role based privilege management system) to ascertain whether the initiator of the request has sufficient privilege to have the delegation statement signed. Presuming that the initiator has sufficient privilege, end user key management system 139 may sign the delegation statement using the private key to which authority over the endpoint device is delegated in the ownership voucher for the endpoint device. The signed delegation statement may be a proxy certificate.

Once obtained, at interaction 276, end user key management system 139 may provide the proxy certificate to orchestrator 132. Thus, even if orchestrator 132 does not have access to the key to which the ownership voucher delegates authority, orchestrator 132 may still establish authority over the endpoint device using the proxy certificate in combination with the ownership voucher.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, the processes and interactions shown in FIGS. 2A-2B may be used to facilitate endpoint device onboarding without requiring that the entity managing the onboarding have access to key to which authority over the endpoint device is delegated in an ownership voucher. Accordingly, the security of keys used to manage devices may be improved by reducing the proliferation of copies of the keys while still enable authority to be validated.

Figure 3:
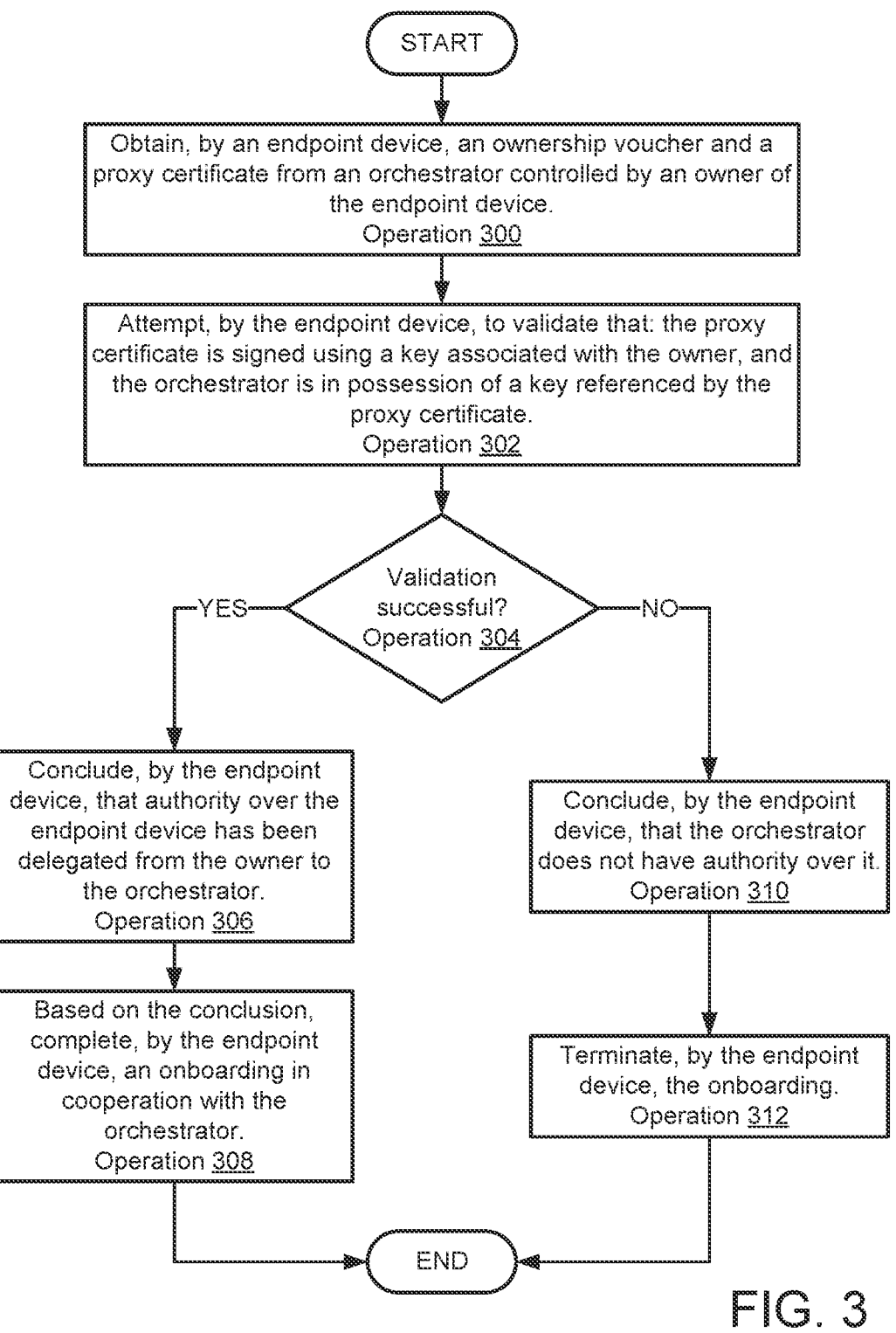
FIG. 3 shows a flow diagram illustrating a method in accordance with an embodiment.

As discussed above, the components of FIG. 1A may perform various methods to onboard endpoint devices. FIG. 3 illustrates a method that may be performed by the components of the system of FIGS. 1A-1K. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for performing an onboarding in accordance with an embodiment is shown. The method may be performed by any of the components of the system shown in FIG. 1A.

Prior to operation 300, an endpoint device may power on, contact a rendezvous system, and be directed to an orchestrator or other device.

At operation 300, an ownership voucher and a proxy certificate may be obtained from the orchestrator. The orchestrator may be controlled by an owner of the endpoint device. The ownership voucher and proxy certificate may be obtained by (i) reading them from storage, (ii) requesting and receiving them from the orchestrator, and/or via other methods.

At operation 302, an attempt may be made to validate that the proxy certificate is signed using a key associated with the owner of the endpoint device, and that the orchestrator is in possession of a key referenced by the proxy certificate. The signature of the proxy certificate may attempt to be validated by performing a signature validation algorithm using a public key from the ownership voucher. The public key may be identified by establishing certificate/delegation chains from the root of trust to various public key included in delegation statements in the certificates in the certificate chains.

Presuming that the signature of the proxy certificate can be validated, possession of the key referenced by the proxy certificate by the orchestrator may be validated by (i) extending the certificate/delegation chains using the information in the proxy certificate to identify an additional public key to which authority has been delegated over the endpoint device, (ii) a challenge may be issued to the orchestrator, and (iii) a signed response may attempt to be verified using the additional public key. If the signed response can be verified using the additional public key, then the orchestrator may be verified has having possession of the referenced key (e.g., the private key corresponding to the additional public key).

At operation 304, it is determined whether the validation attempt of operation 302 is successful. If the validation of operation 302 is successful, then the method may proceed to operation 306. Otherwise, the method may proceed to operation 310.

At operation 306, the endpoint device may conclude that authority over the endpoint device has been delegated from the owner to the orchestrator.

At operation 308, based on the conclusion, the endpoint device may complete an onboarding in cooperation with the orchestrator. The onboarding may be completed by obtaining signed instructions from the orchestrator, attempting to verify the signed instructions using the public key from the proxy certificate, and perform any work orders that can be verified. For example, the signatures of the work orders may be checked using the public key and a signature verification algorithm.

The instructions may include, for example, replacing an existing root of trust maintained by the endpoint device (e.g., with the public key from the proxy certificate), modifying a configuration of the endpoint device, installing/removing software, and/or performing other actions that may place the endpoint device in condition to provide desired computer implemented services that meet the expectations of an owner (e.g., the orchestrator may include various policies that define the specific changes to the operation of the endpoint device that are to be made during onboarding).

The method may end following operation 308.

Returning to operation 304, the method may proceed to operation 310 following operation 304 when the validation is not successful.

At operation 310, the endpoint device may conclude that the orchestrator does not have authority over it.

At operation 31, the endpoint may terminate the onboarding. The onboarding may be terminated by the endpoint device refusing to participate in the onboarding process.

The method may end following operation 312.

Thus, using the method shown in FIG. 3, embodiments disclosed herein may facilitate completion of onboardings even when entities tasked with managing the onboarding lack access to keys to which authority over endpoint devices has been delegated.

Figure 4:
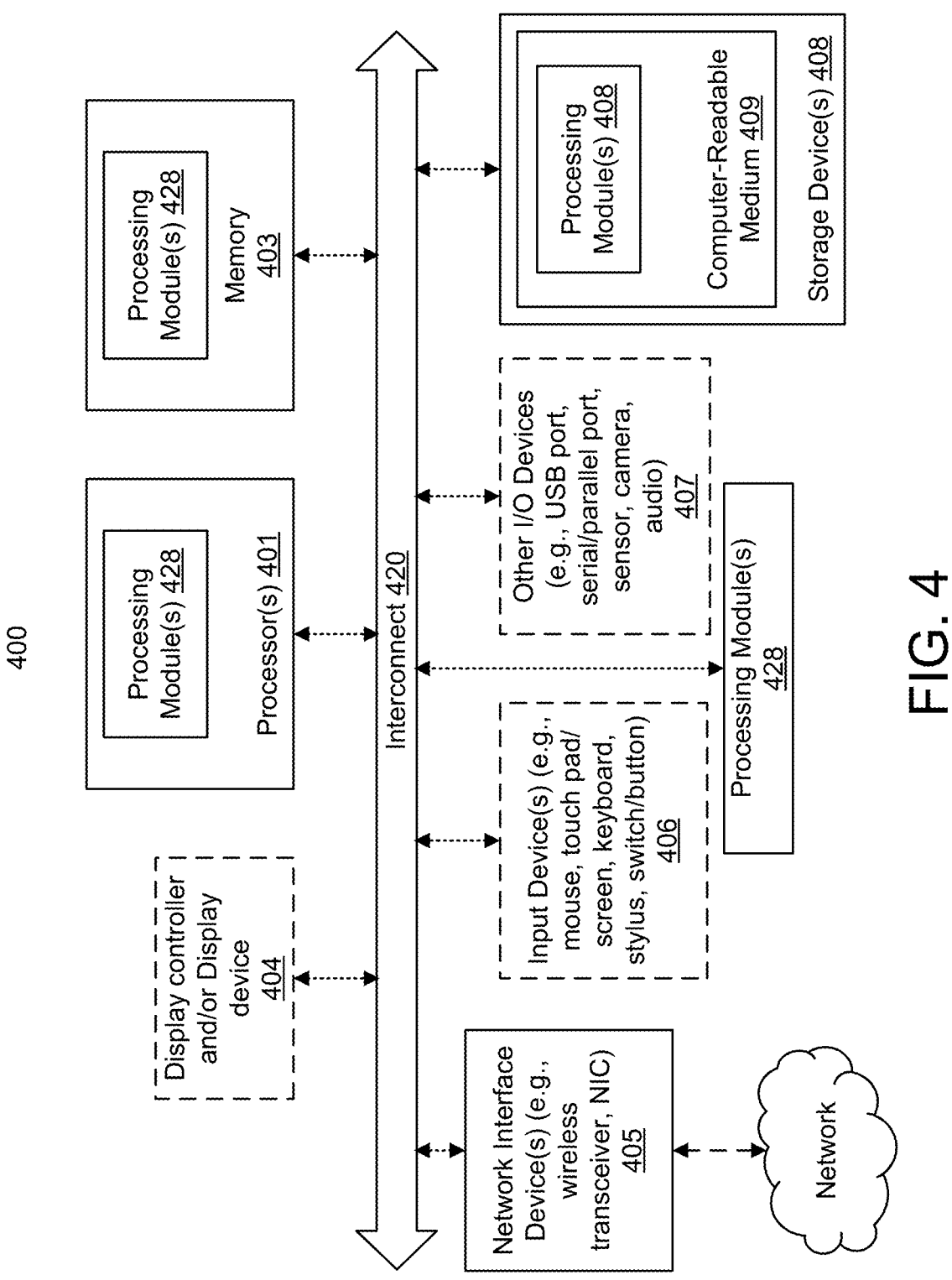
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing endpoint devices, the method comprising:

during an onboarding of an endpoint device of the endpoint devices:

obtaining, by the endpoint device, an ownership voucher and a proxy certificate from an orchestrator controlled by an owner of the endpoint device, the ownership voucher delegates an authority over the endpoint device to the owner while the proxy certificate extends the authority over the endpoint device from the owner to a second entity different from the owner;

attempting to validate that:

the proxy certificate is signed using a key associated with the owner, and the orchestrator is in possession of a key referenced by the proxy certificate;

in an instance of the attempting where the proxy certificate is validated as being signed with the key associated with the owner and the orchestrator is validated as being in possession of the key referenced by the proxy certificate:

concluding, by the endpoint device, that the author-
ity over the endpoint device has been extended
from the owner to the orchestrator, the orchestra-
tor being the second entity; and
based on the authority, completing the onboarding in
cooperation with the orchestrator,
wherein the ownership voucher and the proxy certificate
both comprise delegation statements that delegate the
authority over the endpoint device to entities, the
entities comprising the owner and the second entity, the
ownership voucher comprising a first portion of the
delegation statements that delegates the authority over
the endpoint device to a first portion of the entities
while the proxy certificate comprises a second portion
of the delegation statements that is different from the
first portion of the delegation statements, and the sec-
ond portion of the delegation statements delegates the
authority over the endpoint device to a second portion
of the entities different from the first portion of the
entities.

2. The method of claim 1, wherein attempting to validate
that the proxy certificate is signed using the key associated
with the owner comprises:
attempting to identify a certificate chain stored in the
ownership voucher that allegedly delegates the author-
ity over the endpoint device to the owner;
in an instance of the attempting to identify the certificate
chain where at least one certificate chain of the own-
ership voucher is found to allegedly delegate the
authority:
attempting to cryptographically validate the at least one
certificate chain;
in an instance of the attempting to cryptographically
validate the at least one certificate chain where the at
least one certificate chain is cryptographically vali-
dated successfully:
identifying a delegation statement in the at least one
certificate chain indicating that the authority over
the endpoint device has been delegated to an entity
associated with a public private key pair; and
attempting to use a public key of the public private
key pair to validate that the proxy certificate is
signed using the key.

3. The method of claim 2, wherein the key associated with
the owner is a private key of the public private key pair, and
the private key is controlled by the owner.

4. The method of claim 3, wherein the private key is
inaccessible to the orchestrator.

5. The method of claim 1, wherein completing the
onboarding comprises:
obtaining, by the endpoint device and from the orches-
trator, a signed instruction;
attempting, by the endpoint device, to validate the signed
instruction using a public key to which the proxy
certificate delegates the authority over the endpoint
device; and
in an instance of the attempting to validate where the
signed instruction is validated:
following, by the endpoint device, the signed instruc-
tion.

6. The method of claim 5, wherein attempting to validate
the signed instruction comprises using a signature verifica-
tion algorithm to attempt to establish trust in the signed
instruction using the public key to which the proxy certifi-
cate delegates the authority over the endpoint device.

7. The method of claim 5, wherein the signed instruction
indicates performance of at least one action selected from a
list of actions consisting of:
replacing an existing root of trust maintained by the
endpoint device; and
modifying a configuration of the endpoint device.

8. The method of claim 5, wherein the public key to which
the proxy certificate delegates the authority over the end-
point device is part of a second public private key pair, and
the orchestrator controls a private key of the second public
private key pair and uses the private key to sign instructions
issued to at least some of the endpoint devices.

9. The method of claim 1, wherein the ownership voucher
and the proxy certificate are a unitary data structure, and the
unitary data structure comprises the delegation statements
that delegate the authority over the endpoint device to the
entities.

10. A non-transitory machine-readable medium having
instructions stored therein, which when executed by a pro-
cessor, cause the processor to perform operations for man-
aging endpoint devices, the operations comprising:
during an onboarding of an endpoint device of the end-
point devices:
obtaining, by the endpoint device, an ownership
voucher and a proxy certificate from an orchestrator
controlled by an owner of the endpoint device, the
ownership voucher delegates an authority over the
endpoint device to the owner while the proxy cer-
tificate extends the authority over the endpoint
device from the owner to a second entity different
from the owner;
attempting to validate that:
the proxy certificate is signed using a key associated
with the owner, and
the orchestrator is in possession of a key referenced
by the proxy certificate;
in an instance of the attempting where the proxy
certificate is validated as being signed with the key
associated with the owner and the orchestrator is
validated as being in possession of the key refer-
enced by the proxy certificate:
concluding, by the endpoint device, that the author-
ity over the endpoint device has been extended
from the owner to the orchestrator, the orchestra-
tor being the second entity; and
based on the authority, completing the onboarding in
cooperation with the orchestrator,
wherein the ownership voucher and the proxy certificate
both comprise delegation statements that delegate the
authority over the endpoint device to entities, the
entities comprising the owner and the second entity, the
ownership voucher comprising a first portion of the
delegation statements that delegates the authority over
the endpoint device to a first portion of the entities
while the proxy certificate comprises a second portion
of the delegation statements that is different from the
first portion of the delegation statements, and the sec-
ond portion of the delegation statements delegates the
authority over the endpoint device to a second portion
of the entities different from the first portion of the
entities.

11. The non-transitory machine-readable medium of
claim 10, wherein attempting to validate that the proxy
certificate is signed using the key associated with the owner
comprises:

attempting to identify a certificate chain stored in the ownership voucher that allegedly delegates the authority over the endpoint device to the owner;

in an instance of the attempting to identify the certificate chain where at least one certificate chain of the ownership voucher is found to allegedly delegate the authority:

attempting to cryptographically validate the at least one certificate chain;

in an instance of the attempting to cryptographically validate the at least one certificate chain where the at least one certificate chain is cryptographically validated successfully:

identifying a delegation statement in the at least one certificate chain indicating that the authority over the endpoint device has been delegated to an entity associated with a public private key pair; and attempting to use a public key of the public private key pair to validate that the proxy certificate is signed using the key.

12. The non-transitory machine-readable medium of claim 11, wherein the key associated with the owner is a private key of the public private key pair, and the private key is controlled by the owner.

13. The non-transitory machine-readable medium of claim 12, wherein the private key is inaccessible to the orchestrator.

14. The non-transitory machine-readable medium of claim 10, wherein completing the onboarding comprises:

obtaining, by the endpoint device and from the orchestrator, a signed instruction;

attempting, by the endpoint device, to validate the signed instruction using a public key to which the proxy certificate delegates the authority over the endpoint device; and in an instance of the attempting to validate where the signed instruction is validated:

following, by the endpoint device, the signed instruction.

15. An endpoint device, comprising:

a processor; and a memory coupled to the processor to store instructions, which when executed by the processor, cause the endpoint device to perform operations for onboarding, the operations comprising:

during an onboarding of the endpoint device:

obtaining an ownership voucher and a proxy certificate from an orchestrator controlled by an owner of the endpoint device, the ownership voucher delegates an authority over the endpoint device to the owner while the proxy certificate extends the authority over the endpoint device from the owner to a second entity different from the owner;

attempting to validate that:

the proxy certificate is signed using a key associated with the owner, and the orchestrator is in possession of a key referenced by the proxy certificate;

in an instance of the attempting where the proxy certificate is validated as being signed with the key associated with the owner and the orchestrator is validated as being in possession of the key referenced by the proxy certificate:

concluding, by the endpoint device, that the authority over the endpoint device has been extended from the owner to the orchestrator, the orchestrator being the second entity; and based on the authority, completing the onboarding in cooperation with the orchestrator, wherein the ownership voucher and the proxy certificate both comprise delegation statements that delegate the authority over the endpoint device to entities, the entities comprising the owner and the second entity, the ownership voucher comprising a first portion of the delegation statements that delegates the authority over the endpoint device to a first portion of the entities while the proxy certificate comprises a second portion of the delegation statements that is different from the first portion of the delegation statements, and the second portion of the delegation statements delegates the authority over the endpoint device to a second portion of the entities different from the first portion of the entities.

16. The endpoint device of claim 15, wherein attempting to validate that the proxy certificate is signed using the key associated with the owner comprises:

attempting to identify a certificate chain stored in the ownership voucher that allegedly delegates the authority over the endpoint device to the owner;

in an instance of the attempting to identify the certificate chain where at least one certificate chain of the ownership voucher is found to allegedly delegate the authority:

attempting to cryptographically validate the at least one certificate chain;

in an instance of the attempting to cryptographically validate the at least one certificate chain where the at least one certificate chain is cryptographically validated successfully:

identifying a delegation statement in the at least one certificate chain indicating that the authority over the endpoint device has been delegated to an entity associated with a public private key pair; and attempting to use a public key of the public private key pair to validate that the proxy certificate is signed using the key.

17. The endpoint device of claim 16, wherein the key associated with the owner is a private key of the public private key pair, and the private key is controlled by the owner.

18. The endpoint device of claim 17, wherein the private key is inaccessible to the orchestrator.

19. The endpoint device of claim 15, wherein completing the onboarding comprises:

obtaining, by the endpoint device and from the orchestrator, a signed instruction;

attempting, by the endpoint device, to validate the signed instruction using a public key to which the proxy certificate delegates the authority over the endpoint device; and in an instance of the attempting to validate where the signed instruction is validated:

following, by the endpoint device, the signed instruction.

20. The endpoint device of claim 15, wherein the ownership voucher and the proxy certificate are a unitary data structure, and the unitary data structure comprises the delegation statements that delegate the authority over the endpoint device to the entities.

* * * * *